June 21, 1938.  J. UHL ET AL  2,121,273
HEATING AND COOKING UNIT
Filed April 21, 1937  3 Sheets-Sheet 1
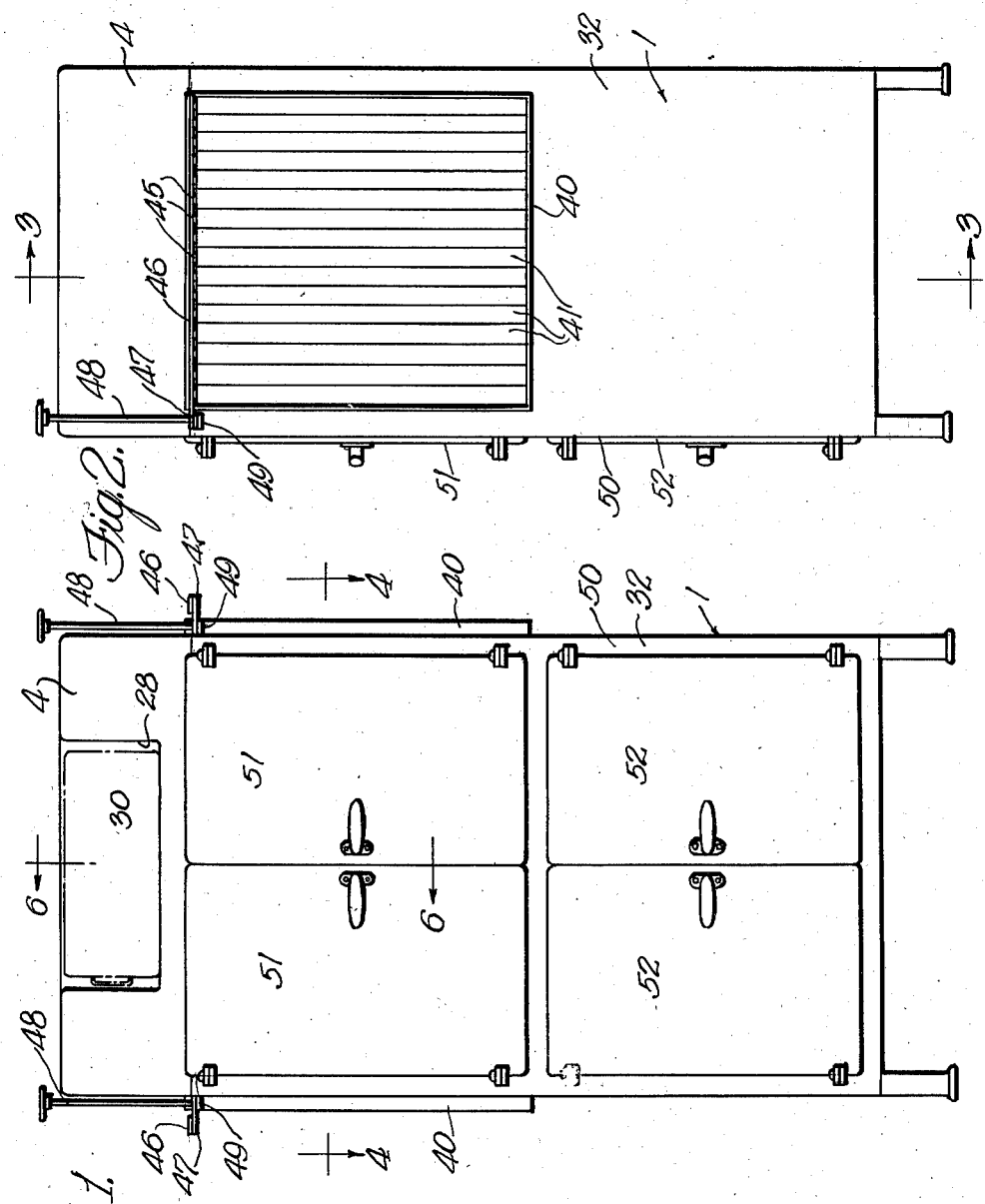

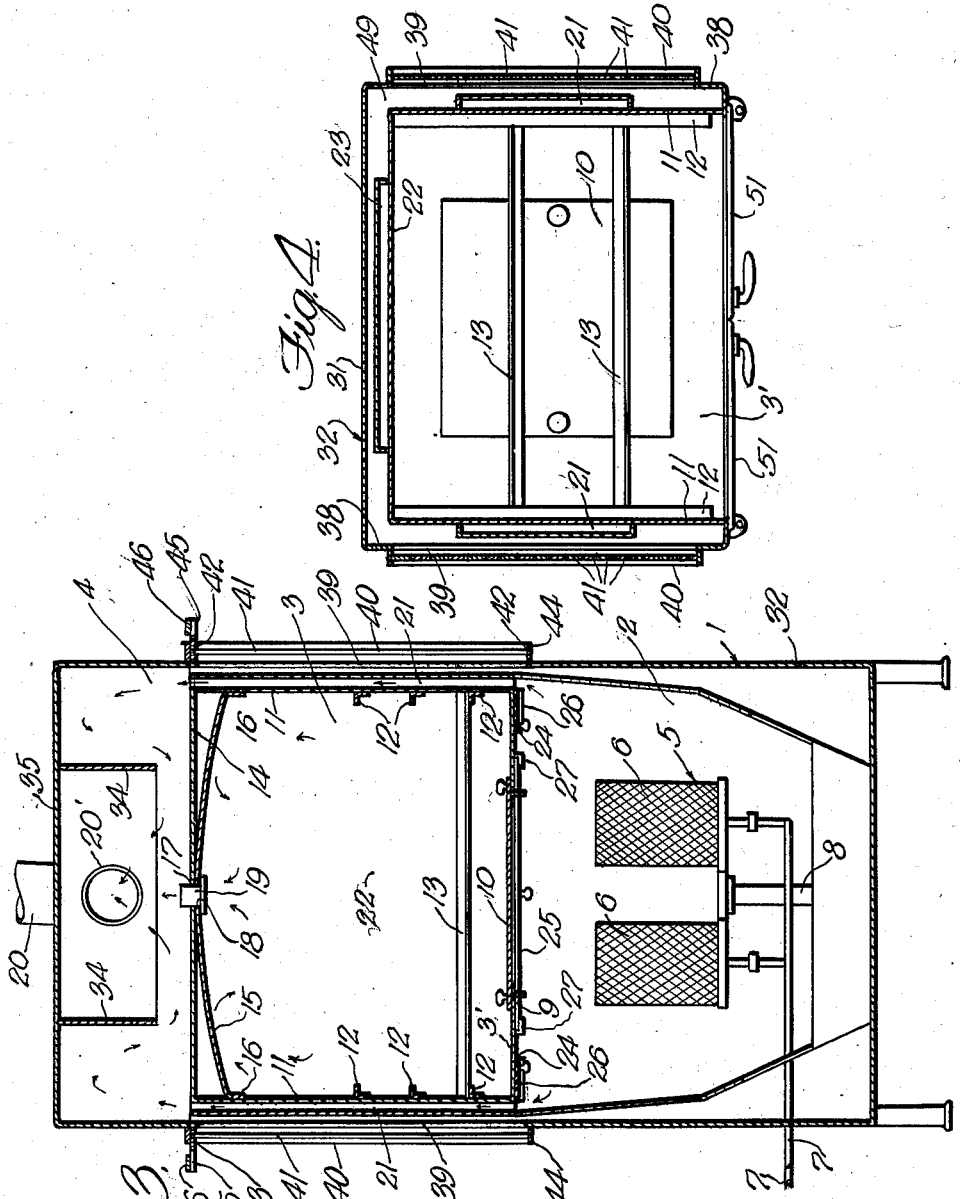

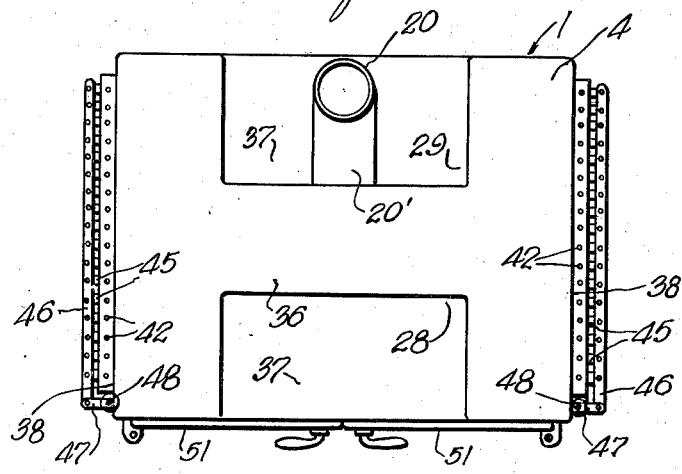
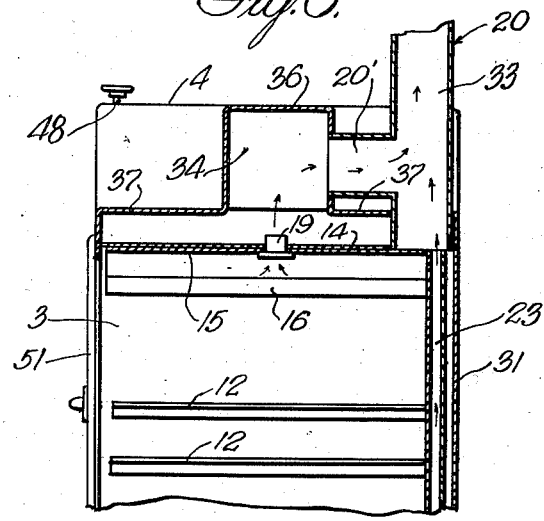

Patented June 21, 1938

2,121,273

UNITED STATES PATENT OFFICE 2,121,273

HEATING AND COOKING UNIT

Joseph Uhl and Richard Porrman, Chicago, Ill.

Application April 21, 1937, Serial No. 138,251

8 Claims. (Cl. 126—6)

This invention relates to heating units and more particularly to a combination heating and cooking unit.

One of the objects of the invention is to provide a heating unit and means for regulating the flow of heat therefrom.

Another object of the invention is to provide means for controlling the flow of heat within said unit.

Another object of the invention is to provide means for controlling the flow of heat to a chimney mounted in the unit.

Another object is to provide an oven mounted within an air chamber.

Another object is to provide means for deflecting the heat in the oven downwardly from the upper portion thereof.

Another object is to provide an outlet within the oven for odorous fumes to the chimney.

With these and other objects in view the invention will be better understood by referring to the following specification and the accompanying drawings wherein like numerals represent corresponding parts and Fig. 1 is a front elevational view of the device Fig. 2 is a side elevational view Fig. 3 is a vertical section taken on the line 3—3 of Fig. 2

Fig. 4 is a transverse section taken on the line 4—4 of Fig. 1

Fig. 5 is a top plan view and

Fig. 6 is a vertical section taken on the line 6—6 of Fig. 1.

Referring more particularly to the drawings 1 indicates a heating unit comprising a fire box 2, an oven 3 and an air chamber 4. Mounted in the fire box 2 is a heating unit 5 shown in the present instance as an oil burner, having burners 6 and oil feed pipes 7 supported by a suitable supporting frame 8 mounted in the lower portion of the fire box 2.

The oven 3 is mounted above the fire box 2 and is provided with an opening 9 in the lower wall 3' adapted to be normally closed by a removable plate 10. The plate 10 is adapted to be removed to permit access to the burners 6 when it is desired to clean or light the burners. Arranged on the side walls 11 of the oven 3 are the usual angle iron shelf supports 12. Longitudinal angle irons 13 are arranged in spaced relation on the lower supports 12 and are adapted to support a roasting pan or the like (not shown).

Arranged adjacent the upper wall 14 of the oven 3 is a concavo-convex deflecting plate 15 having the ends thereof extended downwardly as at 16 adjacent the side walls 11. The walls 14 and 15 are provided with aligned openings 17 and 18 respectively to receive a gas outlet sleeve 19. Heat created within the oven by the burners 6 will be directed downwardly by plate 15 and odorous fumes created by cooking food within the oven will flow therefrom through the sleeve 19 to the transverse portion 20' of a chimney 20 mounted in the chamber 4.

Arranged adjacent the outer face of the side walls 11 intermediate the ends thereof are guide pipes 21. Arranged adjacent the outer face of the back wall 22 of the oven 3 is a guide pipe 23. The guide pipes 21 and 23 are adapted to form communication between the fire box 2 and the chamber 4. Means are provided for controlling the flow of heat from the fire box to the pipes 21 and 23 which in the present instance is in the form of slide plates 24 and 25 respectively which are slidably mounted in guides 26 and 27 respectively.

The chamber 4 is substantially I shaped in plan to provide pockets 28 and 29. A container 30 may be arranged in the pocket 28 and filled with water to provide an emergency hot water can.

Mounted in the upper wall 14 adjacent the back wall 31 of the outer housing 32 is the upright portion 33 of the chimney 20. The pipe 23 communicates at its upper end with the portion 33. Baffle plates 34 are extended downwardly from the upper wall 35 of chamber 4 adjacent the ends of the connecting portion 36 in spaced relation with respect to the wall 14. The lower walls 37 of the pockets 28 and 29 are arranged in spaced relation with the wall 14.

The side walls 38 of the housing 32 are provided with openings 39 adjacent each of which is arranged a shutter frame 40. The frame 40 is provided with aligned upright shutters 41 having pivot pins 42 pivotally mounted in the upper and lower walls 43 and 44 of the frame 40. Links 45 are connected to the upper pins 42 at their inner ends and at their outer ends to a connecting bar 46. The front ends of the bars 46 are connected to a connecting link 47 at its outer end. The inner end of the link 47 is fixed to an upright control rod 48 pivotally mounted in an ear 49 mounted on the walls 38.

The housing 32 is spaced from the oven 3 and fire box 2 to provide an air chamber 49a.

The front wall 50 of the housing 32 is provided with oven doors 51 and fire box doors 52.

From the foregoing it will be seen that we have provided a simple and efficient heating and cooking unit which is economical to manufacture and it is to be understood that various changes in the details of construction may be made without departing from the spirit of the invention.

Having thus described our invention, what we claim is:

1. A heating and cooking unit comprising a housing, a fire box mounted in the lower portion of the said housing, an oven mounted above said fire box spaced from said housing, an I shaped chamber mounted above said housing adapted to enclose the upper end of said oven, a container mounted on said chamber, and means for controlling the flow of heat to said chamber.

2. A device of the class described comprising a housing, a fire box mounted in the lower portion of said housing and spaced therefrom, burners mounted in said fire box, an oven mounted in said housing above said fire box and spaced from said housing, an I shaped chamber mounted above said housing and adapted to enclose the upper end of said oven, baffles extending downwardly from the upper wall of said chamber in spaced relation with the top wall of said oven, pipes mounted on the side and back walls of said oven adapted to form communication between said fire box and said chamber, and means for controlling the flow of heat to said pipes.

3. A device of the class described comprising a housing, a fire box mounted in the lower portion of said housing spaced therefrom, an oven mounted in said housing above said fire box, said oven spaced from said housing, an I shaped chamber mounted above said frame adapted to enclose the upper end of said oven, baffle plates mounted intermediate the ends of said chamber depending downwardly in spaced relation to the upper wall of said oven, a chimney mounted in said chamber, means for controlling the flow of heat to said chimney, and means for controlling the flow of heat through said housing.

4. A device of the class described comprising a housing, a fire box mounted in said housing, an oven mounted above said fire box in spaced relation with respect to said housing, an I shaped chamber mounted above said housing adapted to enclose the top of said oven, a chimney mounted in said chamber, means for controlling the flow of heat from said fire box to said chimney, and shutters mounted on the sides of said housing adapted to adjustably control the flow of air into and through said housing.

5. A device of the class described comprising a housing, a fire box mounted in said housing, an oven mounted in spaced relation to said housing above said fire box, an I shaped chamber mounted above said housing adapted to enclose the upper end of said oven, baffle plates extending downwardly intermediate the ends of said chamber in spaced relation to said upper end of said oven, a chimney mounted in said chamber, pipes mounted on the side walls of said oven adapted to form communication between said fire box and said chamber, a pipe mounted on the back wall of said oven adapted to form communication between said fire box and said chimney, and means for controlling the flow of heat from said fire-box to said pipes.

6. A device of the class described comprising a housing, a fire box mounted in said housing, an oven mounted in spaced relation to said housing above said fire box, an I shaped chamber mounted above said frame adapted to enclose the upper end of said oven, baffle plates depending from the ends of the intermediate portion of said chamber in close proximity to the top of said oven, a chimney mounted in said chamber, pipes mounted on the side walls of said oven adapted to form communication between said fire box and said chamber, a pipe mounted on the back wall of said oven adapted to form communication between said fire box and said chimney, and slide plates mounted on the lower wall of said oven adapted to control the flow of heat from said fire box to said pipes.

7. A device of the class described comprising a housing, an oven mounted in the upper portion of said housing in spaced relation therefrom, a fire box mounted below said oven within said housing, an I shaped chamber mounted above said housing adapted to enclose the upper end of said oven, a chimney mounted in said chamber, means for controlling the flow of heat to said chimney from said fire box, means for controlling the flow of air into and through said housing, means for deflecting the heat downwardly from the upper section of said oven, and means forming communication between said oven and said chamber.

8. A device of the class described comprising a housing, a fire box mounted in the lower portion of said housing, an oven mounted in the upper portion of said housing and spaced therefrom, an I shaped chamber mounted above said housing adapted to enclose the upper end of said oven, pipes mounted on the outer faces of said oven side walls adapted to form communication between said fire box and the ends of said chamber, means controlling the flow of heat from said fire box to the ends of said chamber, a pipe mounted on the back wall of said oven, an upright chimney mounted in said chamber adapted to communicate with said last named pipe, means for controlling the flow of heat between said fire box and said chimney, and a transverse extension on said chimney adapted to form communication between the intermediate portion of said chamber and the upright portion of said chimney.

JOSEPH UHL.
RICHARD PORRMAN.